United States Patent
Smith et al.

(10) Patent No.: US 7,580,586 B1
(45) Date of Patent: Aug. 25, 2009

(54) ENHANCED RECOVERY OF LOW SPATIAL FREQUENCY SPECTRAL INFORMATION IN A FIZEAU FOURIER TRANSFORM SPECTROMETER

(75) Inventors: Eric H. Smith, San Jose, CA (US); Richard L. Kendrick, San Mateo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 724 days.

(21) Appl. No.: 11/405,453

(22) Filed: Apr. 18, 2006

Related U.S. Application Data

(60) Provisional application No. 60/672,536, filed on Apr. 19, 2005.

(51) Int. Cl.
  *G06K 9/40* (2006.01)
  *G06K 9/36* (2006.01)
  *G01B 9/02* (2006.01)
(52) U.S. Cl. .................. 382/254; 382/276; 356/521
(58) Field of Classification Search .............. 382/254, 382/276; 356/521
  See application file for complete search history.

(56) References Cited

U.S. PATENT DOCUMENTS

| | | | |
|---|---|---|---|
| 7,230,717 B2 * | 6/2007 | Brock et al. ............... | 356/495 |
| 7,408,649 B2 * | 8/2008 | Freischlad et al. .......... | 356/497 |
| 7,522,292 B2 * | 4/2009 | Doerband .................... | 356/601 |
| 2005/0007603 A1 * | 1/2005 | Arieli et al. ................. | 356/601 |
| 2006/0239549 A1 * | 10/2006 | Kelly et al. ................. | 382/167 |

\* cited by examiner

*Primary Examiner*—Wenpeng Chen
*Assistant Examiner*—Nirav G Patel
(74) *Attorney, Agent, or Firm*—McDermott Will & Emery LLP

(57) ABSTRACT

A method of restoring low spatial frequency spectral information to an image using a Fizeau Fourier transform spectrometer ("FFTS") system is provided. Portions of a wavefront collected by the FFTS are interfered. The interference patterns are Fourier transformed to generate spectral images. A region of the image is identified, for which spectral information is predetermined. Object estimates are generated, each of which corresponds to a spectral image. Each object estimate is iteratively adjusted applying a system spectral optical transfer function ("SOTF") to it and modifying it until a match is made with the corresponding spectral image. Each adjusted object estimate is then iteratively restored by applying a system optical transfer function ("OTF") to it and then applying a DC bias to it until a match is made between the identified region in the sum of the object estimates and the identified region of a measured panchromatic object image.

27 Claims, 14 Drawing Sheets

1110

1120

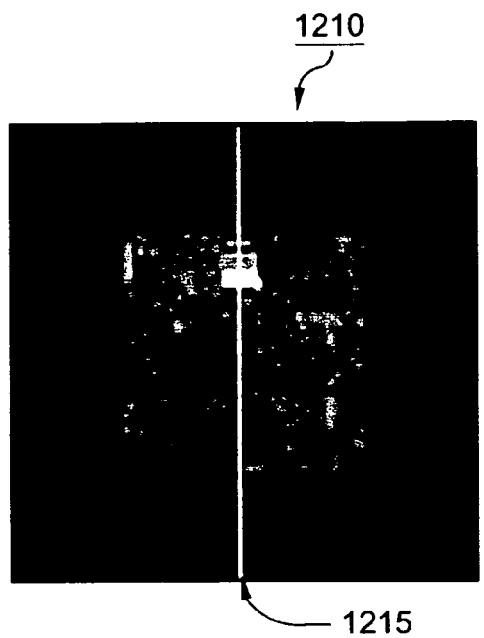 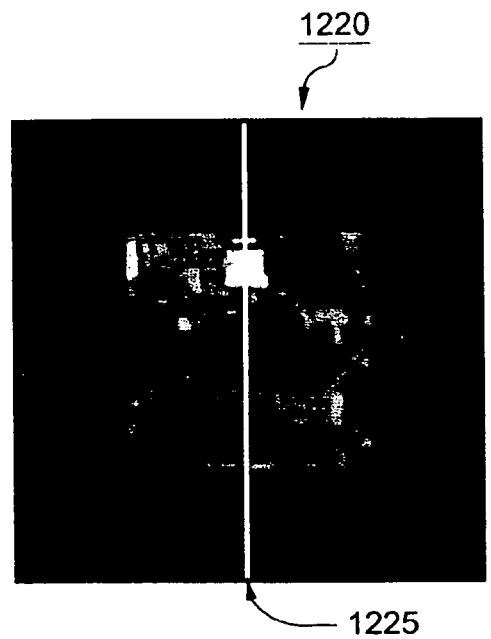
FIG. 12A
FIG. 12B
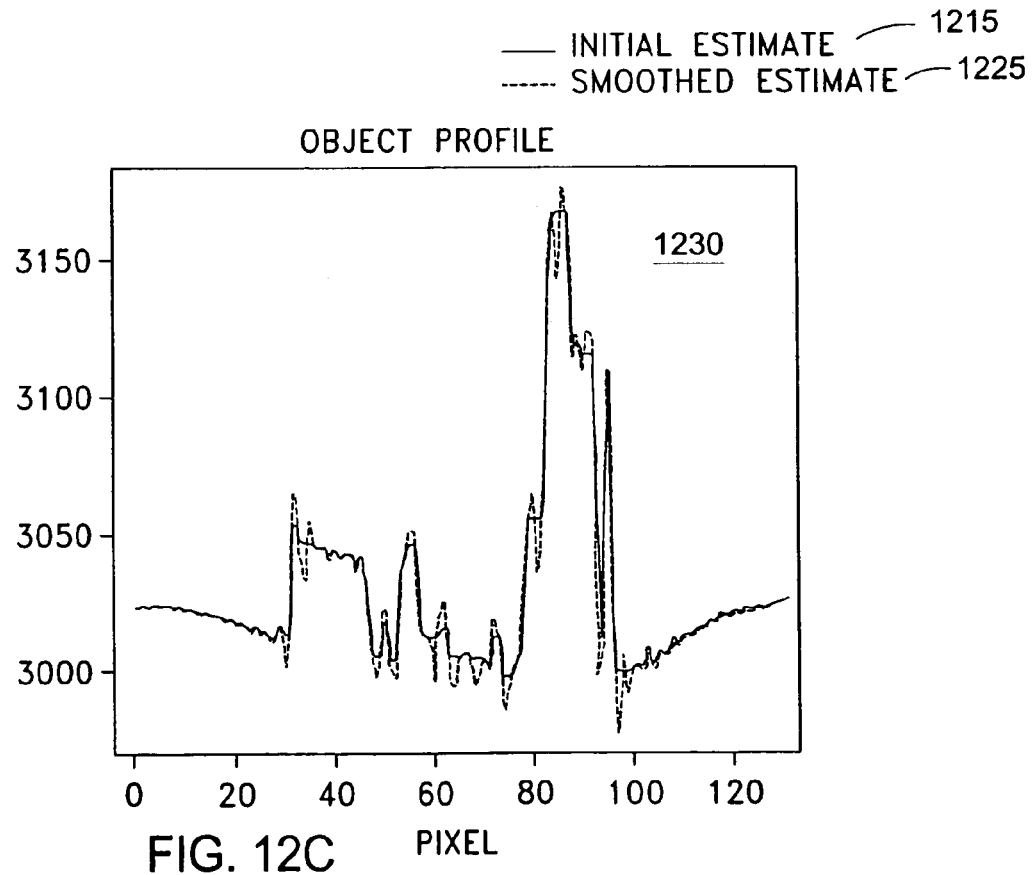
FIG. 12C

ENHANCED RECOVERY OF LOW SPATIAL FREQUENCY SPECTRAL INFORMATION IN A FIZEAU FOURIER TRANSFORM SPECTROMETER

CROSS-REFERENCE TO RELATED APPLICATION

The present application claims the benefit of priority under 35 U.S.C. §119 from U.S. Provisional Patent Application Ser. No. 60/672,536 entitled "ENHANCED RECOVERY OF LOW SPATIAL FREQUENCY SPECTRAL INFORMATION IN A FIZEAU FOURIER TRANSFORM SPECTROMETER," filed on Apr. 19, 2005, the disclosure of which is hereby incorporated by reference in its entirety for all purposes.

STATEMENT REGARDING FEDERALLY SPONSORED RESEARCH OR DEVELOPMENT

Not Applicable.

FIELD OF THE INVENTION

The present invention generally relates to Fourier transform spectrometry and, more particularly, relates to low spatial frequency restoration of Fizeau Fourier transform spectrometer ("FFTS") spectral data.

BACKGROUND OF THE INVENTION

When extracting spectral information from a radiation source, Fourier transform spectroscopy is often used. One technique used in Fourier transform spectroscopy involves using a Michelson interferometer, in which the amplitude of a collected wavefront is divided into two wavefronts, which are interfered to form an interference pattern. The optical path length of one of the wavefronts is varied to permit the collection of intensity information from a number of interference patterns formed by the two wavefronts. This intensity information is then Fourier transformed to extract spectral information from the wavefront. Because the entire collected wavefront is interfered with itself, the Fourier transform contains all the spatial frequencies contained in the optical transfer function ("OTF") of the system (which is given by the auto-correlation of the pupil function of the collecting elements of the system). The use of a Michelson interferometer to collect spectral information experiences several drawbacks, however. For example, the spectral bandwidth of the system is limited by the beamsplitter which divides the collected wavefront. Further, because the OTF is wavelength dependent, the spectral data obtained by the Fourier transform varies from the object spectrum.

Another approach to Fourier transform spectroscopy involves using a Fizeau interferometer, in which separate portions of a collected wavefront are interfered with each other to form interference patterns on an image plane. As the optical path length of one of the separate portions of the collected wavefront is changed, a phase delay is introduced between the portions, causing interference patterns to translate across the image plane. These interference patterns are Fourier transformed to extract spectral fringe visibility data for all field points. Because separate portions of the collected wavefront are interfered in a Fizeau Fourier transform spectrometer ("FFTS"), only those spatial frequencies modulated by the spectral optical transfer function ("SOTF") of the system (which is given by the cross-correlation of the pupil functions of the elements used to collect the separate portions of the collected wavefront) are present in the Fourier transform. Further, because the SOTF is given by the cross-correlation of separate apertures, all low spatial frequency ("DC") information is missing from the Fourier transform.

Accordingly, there is a need for a method to restore both the DC information and the spectral information related to low spatial frequency components of an image obtained with an FFTS. The present invention satisfies these needs and provides other advantages as well.

SUMMARY OF THE INVENTION

In accordance with the present invention, low spatial frequency spectral information is restored to an image of an object collected by a Fizeau Fourier transform spectrometer ("FFTS") system. Using predetermined information about the spectra of one or more regions of the image, either from shadows imposed on the image or from known low spatial frequency features in the object, a plurality of object estimates are generated and iteratively adjusted by applying a system spectral optical transfer function ("SOTF") to each object estimate to generate a spectral estimate and then updating the spatial frequency information of the object estimate until a good match is made between each spectral object estimate and a corresponding spectral image generated by the FFTS system. The adjusted object estimates are restored by applying a system optical transfer function ("OTF") to each adjusted object estimate and summing the resulting monochromatic object estimates to create a panchromatic object estimate which is compared against a measured panchromatic object image collected by the system, and then applying a DC bias to the adjusted object estimates based upon the predetermined spectral information of one or more regions of the image until a match between the panchromatic object estimate and the measured panchromatic object image.

According to one embodiment, the present invention is a method of restoring low spatial frequency spectral information to an image using a Fizeau Fourier transform spectrometer system having a plurality of collecting elements. The method includes the step of Fourier transforming interference patterns in a delta cube generated by interfering portions of a wavefront collected by the plurality of collecting elements to generate a lambda cube having a plurality of spectral images. Each interference pattern in the delta cube corresponds to an interference pattern generated with a different optical path length of one or more of the collecting elements. Each spectral image corresponds to a range of wavelengths of the collected wavefront. The method further includes the steps of identifying a region of the image for which a spectral information is predetermined and generating a plurality of object estimates for each of which a spatial frequency information is uniform, each object estimate corresponding to a spectral image of the lambda cube. The method further includes the step of adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube. The method further includes the step of restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

According to another embodiment, computer-executable process steps of the present invention for restoring low spatial frequency spectral information to an image using a Fizeau Fourier transform spectrometer system having a plurality of collecting elements include the step of Fourier transforming interference patterns in a delta cube generated by interfering portions of a wavefront collected by the plurality of collecting elements to generate a lambda cube having a plurality of spectral images. Each interference pattern in the delta cube corresponds to an interference pattern generated with a different optical path length of one or more of the collecting elements. Each spectral image corresponds to a range of wavelengths of the collected wavefront. The computer executable process steps further include the steps of identifying a region of the image for which a spectral information is predetermined and generating a plurality of object estimates for each of which a spatial frequency information is uniform, each object estimate corresponding to a spectral image of the lambda cube. The computer executable process steps further include the step of adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube. The computer executable process steps further include the step of restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

According to yet another embodiment, the current invention is a Fizeau Fourier transform spectrometer system. The system includes a plurality of collecting elements disposed to collect portions of a wavefront. Each of the plurality of collecting elements has a field stop at an intermediate image point. At least one of the plurality of collecting elements has an adjustable optical path length. The system further includes combiner optics for combining and interfering the collected portions of the wavefront on an image plane to generate a delta cube having a plurality of interference patterns. Each interference pattern in the delta cube corresponds to an interference pattern generated with a different optical path length of one or more of the collecting elements. The system further includes one or more processors and a computer readable medium carrying one or more sequences of instructions for restoring low spatial frequency spectral information to an image. Execution of the one or more sequences of instructions by the one or more processors causes the one or more processors to perform the step of Fourier transforming the interference patterns in the delta cube to generate a lambda cube having a plurality of spectral images, each spectral image corresponding to a range of wavelengths of the collected wavefront. Execution of the one or more sequences of instructions by the one or more processors causes the one or more processors to further perform the steps of identifying a region of the image for which a spectral information is predetermined and generating a plurality of object estimates for each of which a spatial frequency information is uniform, each object estimate corresponding to a spectral image of the lambda cube. Execution of the one or more sequences of instructions by the one or more processors causes the one or more processors to further perform the step of adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube. Execution of the one or more sequences of instructions by the one or more processors causes the one or more processors to further perform the step of restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIGS. 12A to 12C illustrate the method step of applying a smoothing filter to an object estimate according to one aspect of the present invention;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
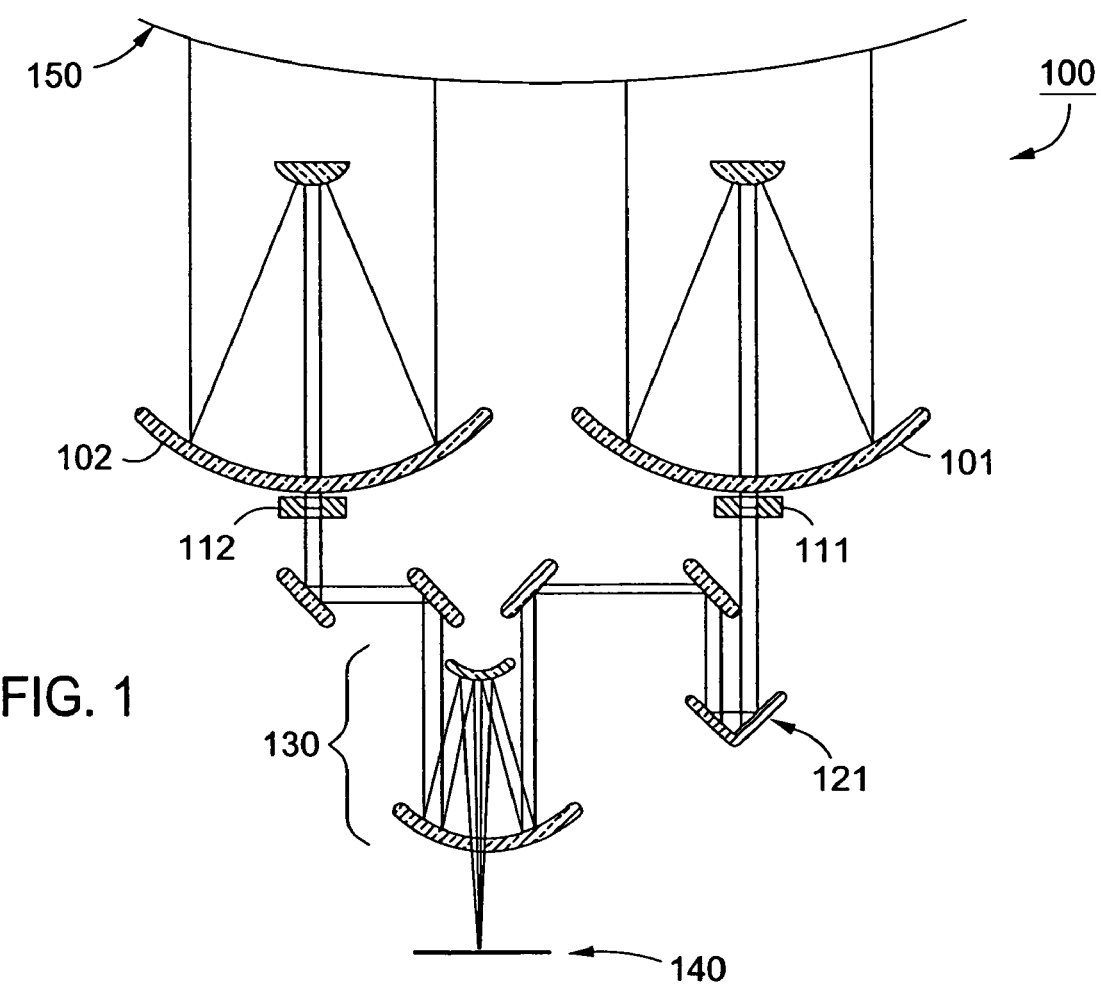
FIG. 1 depicts a Fizeau Fourier transform spectrometer system according to one embodiment of the present invention.

FIG. 1 depicts a Fizeau Fourier Transform Spectrometer ("FFTS") system 100 according to one embodiment of the present invention. FFTS system 100 includes multiple collecting elements 101 and 102, for collecting different regions of an incident wavefront 150. Each collecting element 101 and 102 has an associated field stop 111 and 112 at an intermediate image point for limiting the field of view of each collecting element. At least one of the collecting elements, in this case collecting element 101, includes a path length adjustment device 121 for adjusting the optical path length of the incident radiation gathered by collecting element 101. FFTS system 100 further includes combiner optics, such as combiner telescope 130, for combining the incident radiation collected by collecting elements 101 and 102 and interfering the radiation on an image plane 140 to generate interference patterns.

While FFTS system 100 has been illustrated as including two collecting elements, the scope of the present invention includes FFTS systems with any number of collecting elements greater than one. In embodiments in which an FFTS system of the present invention includes more than two collecting elements, the collecting elements may be associated into two or more groups of elements for the purpose of interfering the collected portions of an incident wavefront. The optical path length of each collecting element in a group will remain the same as the optical path length of every other collecting element in the group. Accordingly, to generate interference patterns, the optical path lengths, of one or more of the groups will be varied with respect to another one of the groups.

Figure 2:
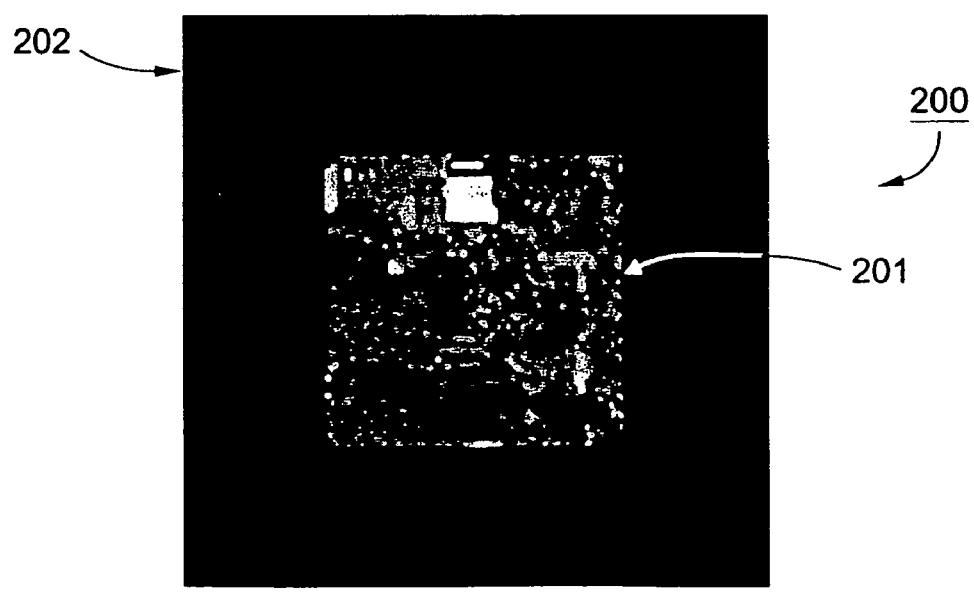
FIG. 2 depicts an object to be imaged by a Fizeau Fourier transform spectrometer system according to one aspect of the present invention.
Figure 3:
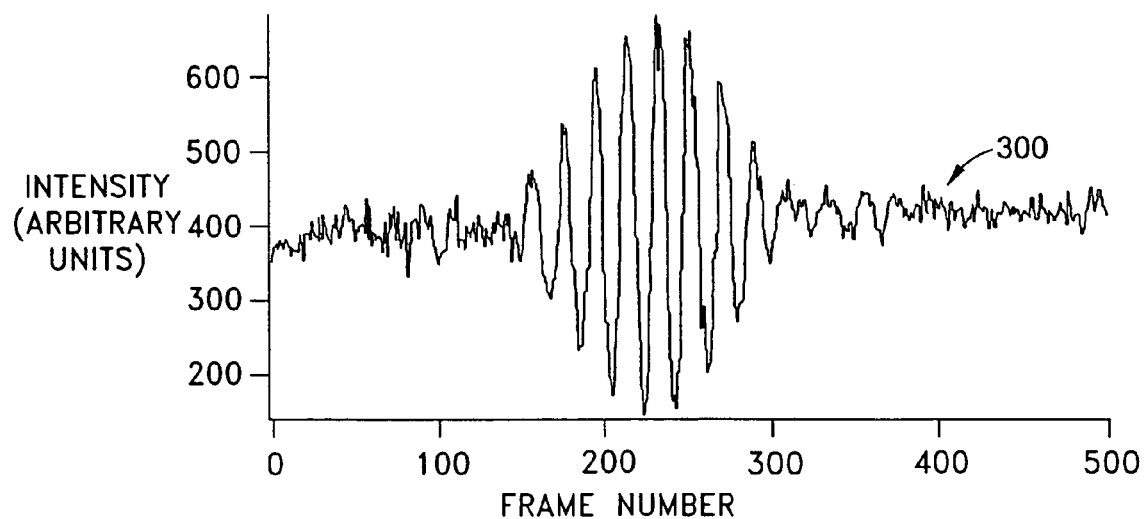
FIG. 3 is a graph illustrating a fringe packet for one field point of an object generated by a Fizeau Fourier transform spectrometer system according to one aspect of the present invention.

FIG. 2 depicts an exemplary object 200 to be imaged by FFTS system 100, and to which low spatial frequency spectral information will be restored according to a method of the present invention. Object 200 includes an image scene 201 and a border region 202 of artificially imposed shadow, as will be discussed in greater detail below. FFTS system 100 is used to generate fringe packets for each field point of object 200. Each fringe packet contains intensity information for a given field point of object 200 over a variety of path length adjustments of one or more of the collecting elements of FFTS system 100. An exemplary fringe packet 300 for one field point of object 200 is illustrated in FIG. 3.

Figure 4:
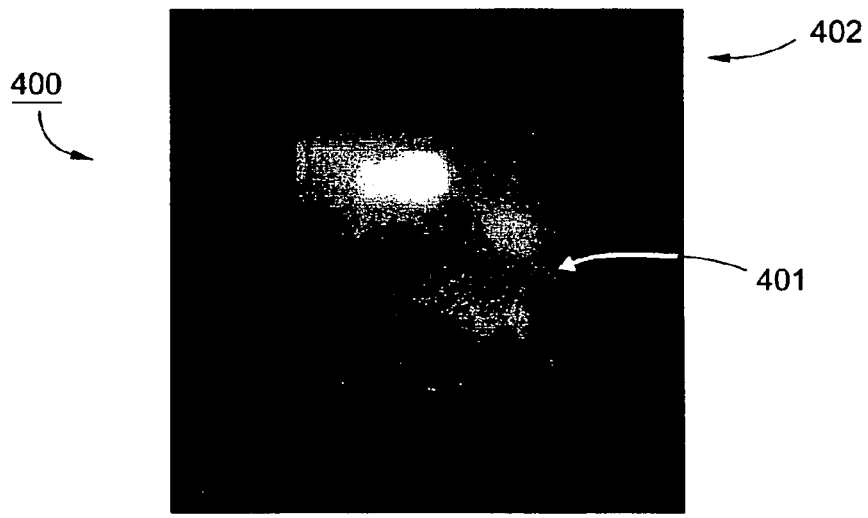
FIG. 4 depicts an interference pattern generated by a Fizeau Fourier transform spectrometer system according to one aspect of the present invention.

By combining the fringe packets for each field point in object 200, a plurality of interference patterns are generated, where each interference pattern corresponds to a single path length adjustment. The collection of interference patterns thus generated is referred to as a delta cube. One such interference pattern 400 is illustrated in FIG. 4. Interference pattern 400 includes interference information 401 from image scene 201 and interference information 402 from border region 202 of object 200. Interference information 401 relating to image scene 201 appears "blurry" in comparison to image scene 201 because of the effect of constructive and destructive interference caused by the phase delay in FFTS system 100.

Figure 5:
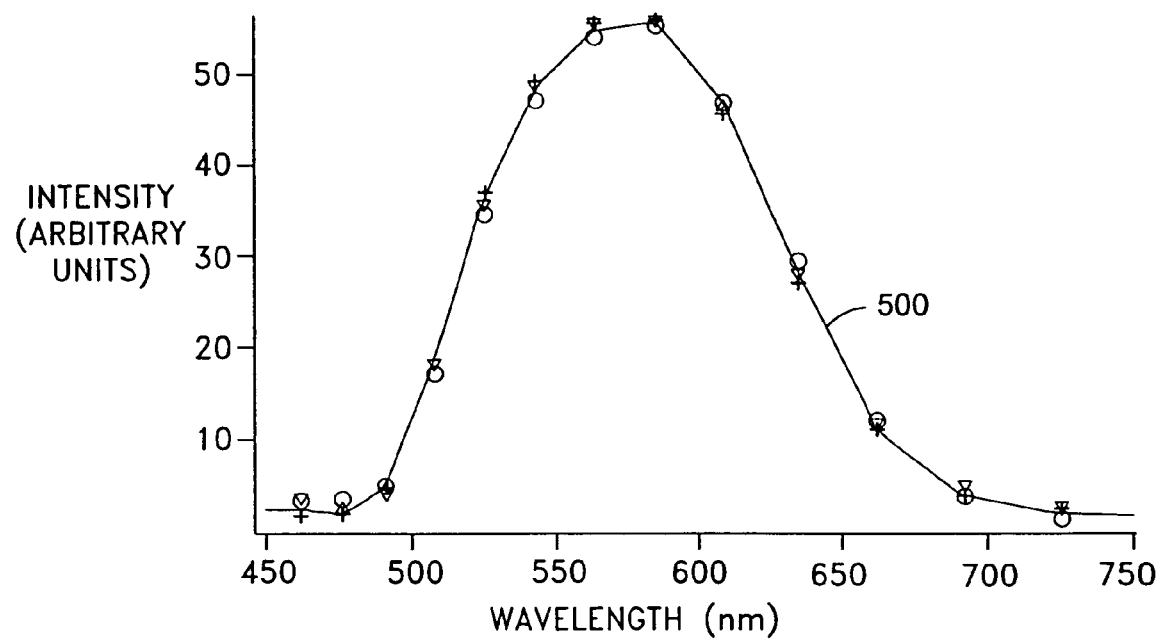
FIG. 5 is a graph illustrating the spectral fringe visibility for one field point of an object generated by a Fizeau Fourier transform spectrometer system according to one aspect of the present invention.

The Fourier transform of a fringe packet, such as fringe packet 300, gives the spectral fringe visibility of object 200 for the field point that the fringe packet represents. The spectral fringe visibility of a field point contains intensity information of that field point over a range of spectral frequencies. An exemplary spectral fringe visibility curve 500 for fringe packet 300 is illustrated in FIG. 5.

Figure 6:
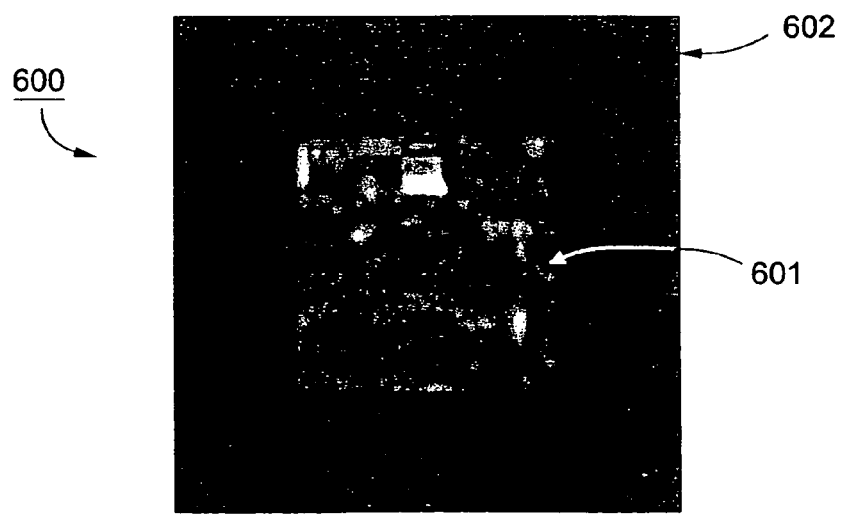
FIG. 6 depicts a spectral image created by Fourier transforming an interference pattern generated by a Fizeau Fourier transform spectrometer system according to one aspect of the present invention.

By combining the spectral fringe visibility information for each field point in object 200, a plurality of spectral images are generated, where each spectral image corresponds to a range of wavelengths of incident wavefront 140 collected by FFTS system 100. The collection of spectral images thus generated is referred to as a lambda cube. One such spectral image 600 is illustrated in FIG. 6. Spectral image 600 includes intensity information for a range of wavelengths for each field point in object 200. The information 601 corresponding to image scene 201 and the information 602 corresponding to border region 202 appear to be "grayer" than the corresponding regions of object 200 because spectral image 600 is missing information corresponding to zero and low spatial frequencies.

Figure 7A:
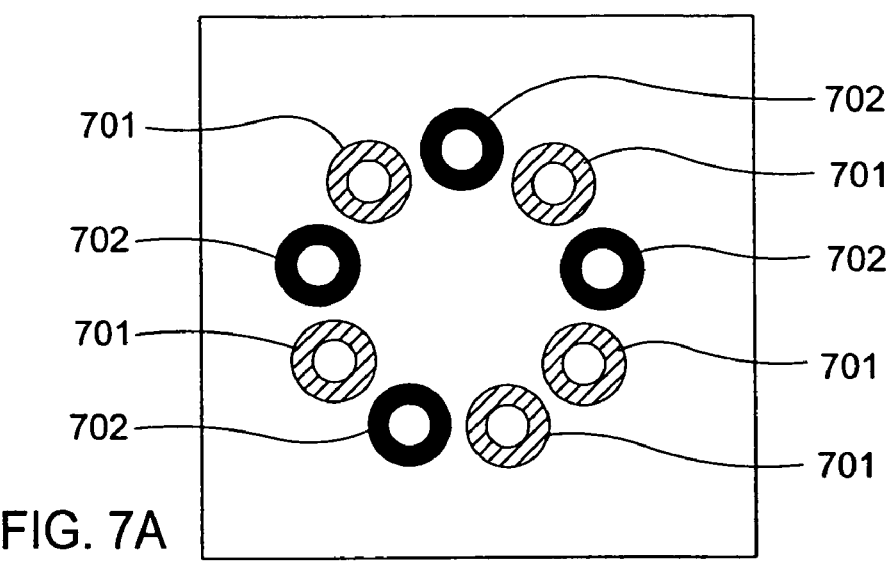
FIG. 7A illustrates exemplary pupil functions for a Fizeau Fourier transform spectrometer system according to one aspect of the present invention.

The spatial frequency information of each spectral image in the lambda cube differs from the spatial frequency information of object 200 in the corresponding range of wavelengths according to the spectral optical transfer function ("SOTF") of FFTS system 100. The SOTF of a FFTS system is dependent upon the pupil functions of the collecting elements of the system. Exemplary pupil functions for a nine element FFTS system are illustrated in FIG. 7A. The pupil functions in FIG. 7A are divided into two groups of collecting elements, represented by pupil functions 701 and 702, corresponding to the two groups used to interfere portions of a collected wavefront. The SOTF for this arrangement is given by the cross-correlation of the pupil functions of the two groups of the collecting elements 701 and 702. A graphical depiction of the SOTF 720 of this arrangement is illustrated in FIG. 7C.

While the present exemplary embodiment has been described as including two groups of collecting elements, the scope of the present invention is not limited to such an arrangement. Rather, the present invention includes arrangements in which the optical path lengths of more than two groups of collecting elements are varied to generate interference patterns. In such an embodiment, the FFTS system may have more than one SOTF, which will be used in the restoration of low spatial frequency spectral data, as described more fully below.

Figure 7B:
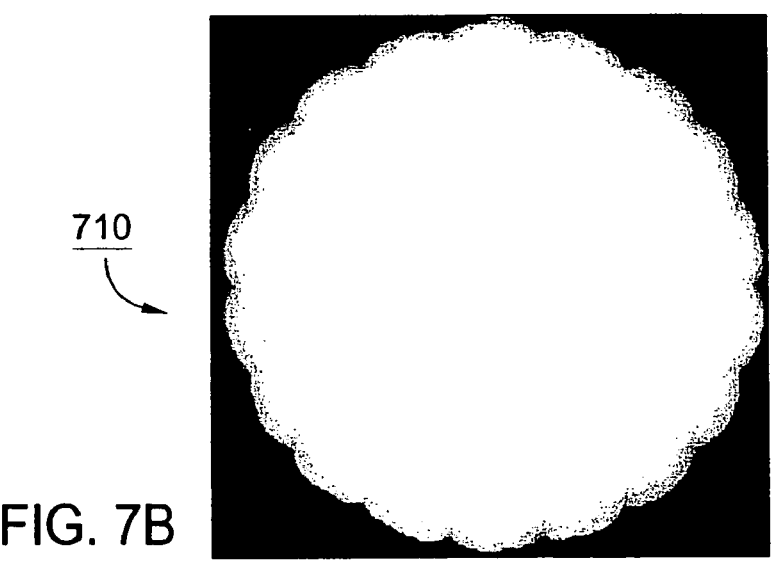
FIG. 7B is a graphical depiction of an optical transfer function of a Fizeau Fourier transform spectrometer system according to one aspect of the present invention.
Figure 7C:
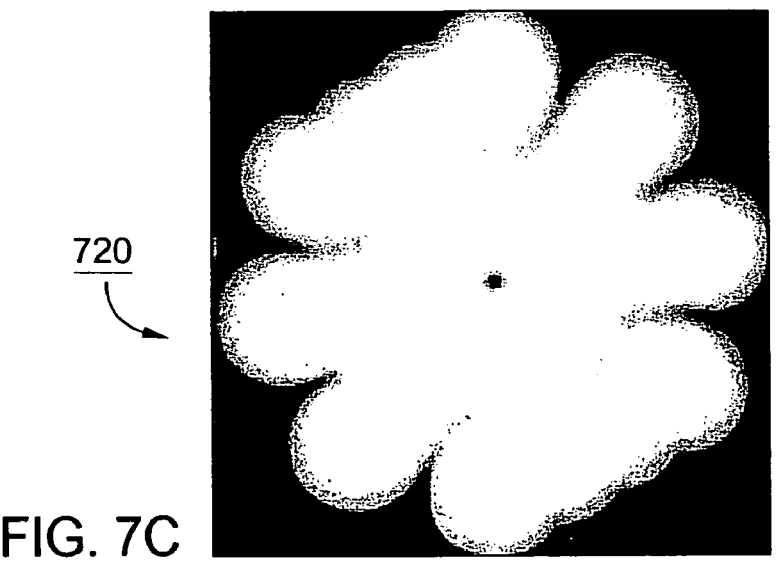
FIG. 7C is a graphical depiction of a spectral optical transfer function of a Fizeau Fourier transform spectrometer system according to one aspect of the present invention.

The graphical depiction of SOTF 720 in FIG. 7C illustrates the response to spatial frequency information of the FFTS system whose pupil functions are illustrated in FIG. 7A. The center of SOTF 720 corresponds to zero spatial frequency information, while the regions farther from the center correspond to higher spatial frequencies in different orientations. The brighter regions of SOTF 720 indicate spatial frequencies and orientations to which the system has a strong response (e.g., the system can image these spatial frequencies in these orientations very well). Conversely, the darker regions indicate spatial frequencies and orientations to which the system has a poor response. Accordingly, the "hole" in the middle of SOTF 720 illustrates the poor response of the system to zero spatial frequency and low spatial frequency spectral information. As will be described more fully below, the present invention provides a method for restoring this low spatial frequency spectral information using a FFTS.

The optical transfer function ("OTF") of a system is given by an auto-correlation of all of the collecting elements of the system, as opposed to the SOTF, which is given by a cross-correlation of different groups of collecting elements of the system. FIG. 7B illustrates a graphical depiction of the OTF 710 of the nine element system whose pupil functions are illustrated in FIG. 7A. Much like the graphical depiction of SOTF 720 in FIG. 7C, the brighter regions of OTF 710 indicate spatial frequencies and orientations to which the system has a strong response when all of the collecting elements are adjusted to the same optical path length. The OTF of an FFTS will be used in the restoration of low spatial frequency spectral information, as described more fully below.

Figure 8:
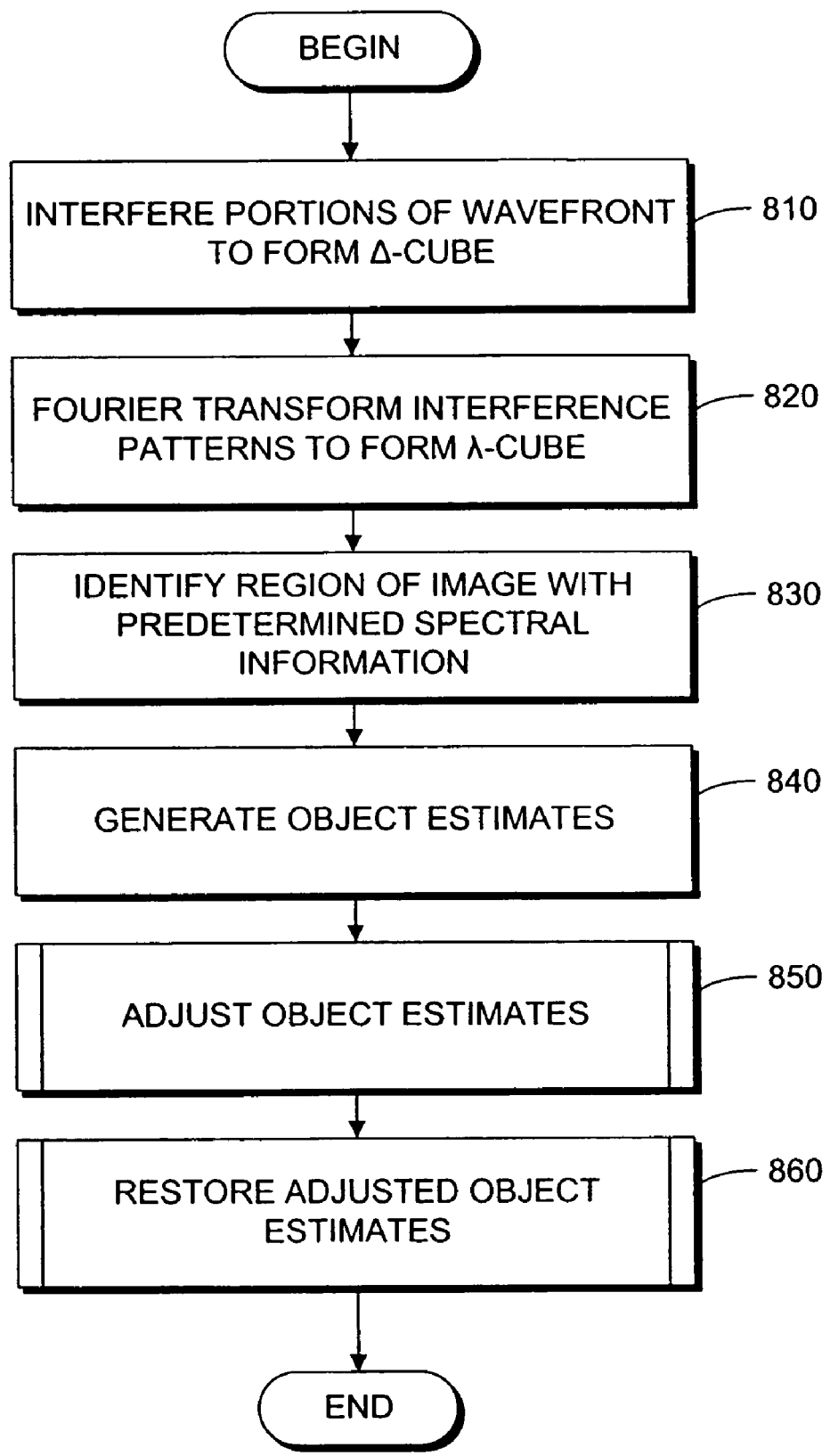
FIG. 8 is a flowchart depicting a method of restoring low spatial frequency spectral information to an image generated by a Fizeau Fourier transform spectrometer system according to one embodiment of the present invention.

FIG. 8 is a flowchart depicting a method of restoring low spatial frequency spectral information to an image generated by a FFTS according to one embodiment of the present invention. The method begins with step 810, in which portions of an incident wavefront are interfered in a FFTS to generate a delta cube having a plurality of interference patterns. Each interference pattern thus generated corresponds to a single path length difference between collecting elements (e.g., sub-telescopes) of the FFTS. The FFTS may have any number of collecting elements greater than one. Where more than two collecting elements are used, the collecting elements may be associated into two or more groups of collecting elements, so that the optical path lengths of one or more groups of collecting elements are varied with respect to the optical path lengths of the other groups.

In one embodiment, one of the interference patterns in the delta cube corresponds to zero path length difference between the collecting elements of the FFTS. The interference pattern thus generated, having zero phase delay, is a measured panchromatic object image of the FFTS system that will be used in the restoration of low spatial frequency spectral information, as described more fully below. The inclusion of a measured panchromatic object image in the delta cube is not necessary for the method of the present invention, and embodiments in which a measured panchromatic object image is not included in the delta cube are also within the scope of the present invention.

In step 820, the interference patterns generated in step 810 are Fourier transformed to generate a lambda cube having a plurality of spectral images. Each spectral image corresponds to a range of wavelengths of the collected wavefront, and contains intensity information for each field point in the object. The spatial information in each spectral image in the lambda cube differs from the spatial information in the object for the corresponding range of wavelengths due to the SOTF of the FFTS system.

In step 830, a region or regions of the image containing predetermined spectral information are determined. The region is preferably a large region of zero or low spatial frequency. According to one embodiment, if prior knowledge of the object being imaged is available, it is possible to identify one or more large regions of the object with known spectral signatures. For example, if the object being imaged is known to contain a large area of concrete, such as a parking lot, for which the spectral signature is known this region may be identified in step 830. Alternatively, if the object contains large cool regions in the infrared spectral region against which brighter regions are set, such as, for example, factory smoke stacks, then the large cool regions may be identified in step 830 as regions with a low or zero spatial frequency for which spectral information is predetermined.

According to another embodiment, in which no prior knowledge of the object is required, artificially imposed shadows can be utilized to provide a region with a low or zero spatial frequency for which spectral information is predetermined. For example, by imposing field stops at intermediate image points in the FFTS, shadows may be imposed on the image. The shadows should be imposed prior to the interference of the portions of the wavefront (e.g., optically upstream of the combiner telescope).

In one embodiment, the artificial shadows imposed on the image are arranged to form borders around the outside of the image. If the field stops are arranged such that the imposed shadows border the image, then low spatial frequency information will be available in both a horizontal and vertical orientation (e.g., the borders extended the full width and height of the image, providing regions of zero spatial frequency in both orientations). Object 200 in FIG. 2 has had such artificial shadow borders 202 imposed upon it in this manner. In alternative embodiments, artificial shadows may be imposed in arrangements other than borders on the image, such as, for example, bands or other shapes, whether at the edge or through the middle of the image.

While the identification of a region or regions of the image containing predetermined spectral information has been described as occurring after the collection of interference patterns and the generation of spectral images, the scope of the present invention is not limited to this order. The identification step may take place at any time prior to the restoration of object estimates in step 860, described more fully below.

In step 840, a plurality of object estimates are generated. The number of object estimates is equal to the number of spectral images in the lambda cube, and each object estimate corresponds both to a spectral image in the lambda cube and to a range of wavelengths of the collected wavefront. The object estimates are preferably initially "flat" object estimates, for which the spatial frequency information is uniform. The intensity of the initial object estimates may be any value, so long as the intensity is constant over the entire initial object estimate. These object estimates will be used to restore the low spatial frequency spectral information in the image, as described more fully below.

In step 850, each object estimate generated in step 840 is iteratively adjusted until a "match" is made with a corresponding spectral image in the lambda cube, as will be described more fully below with reference to FIG. 9.

Figure 10:
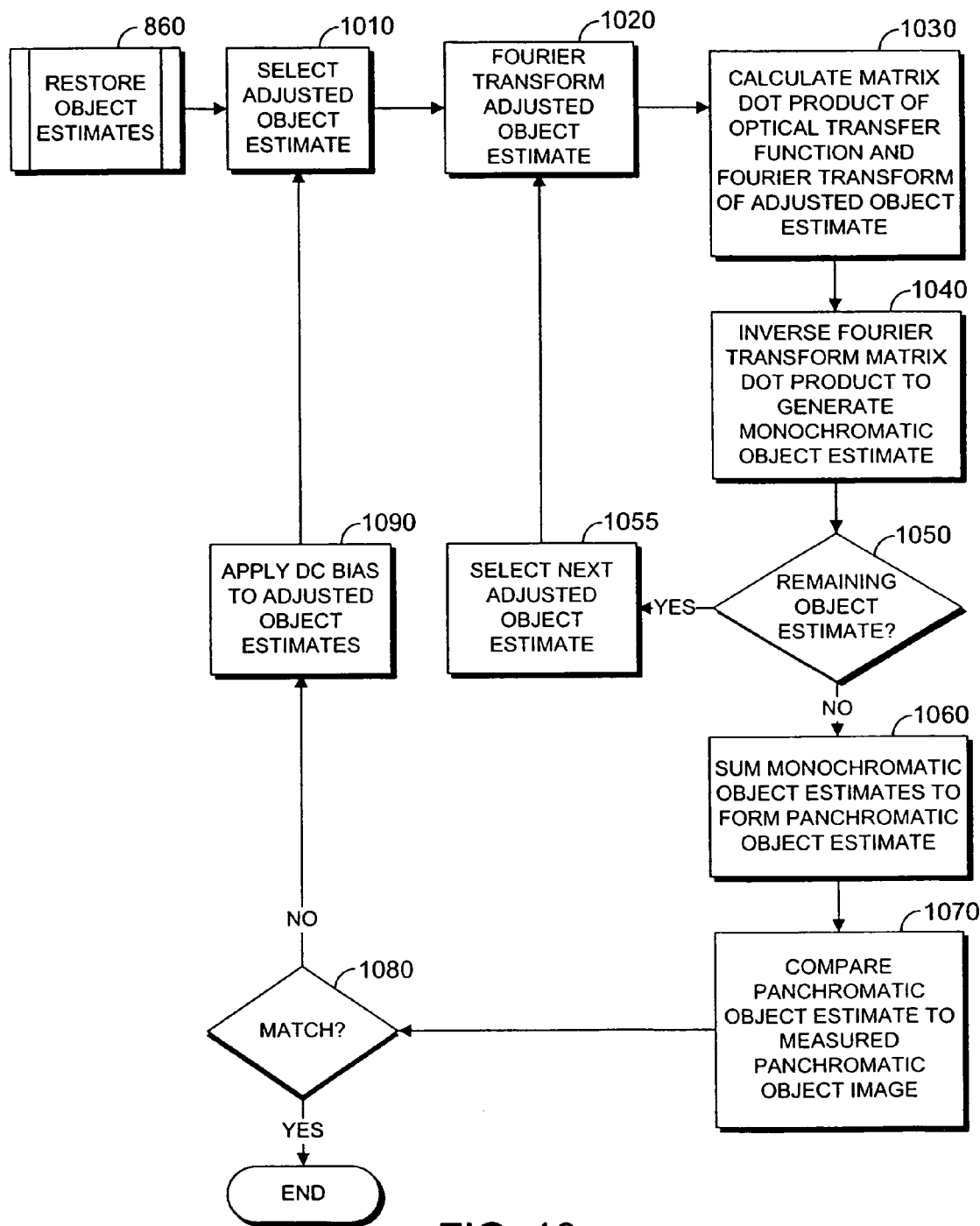
FIG. 10 is a flowchart depicting the method step of restoring object estimates in greater detail according to one aspect of the present invention.

In step 860, the adjusted object estimates are transformed and summed into a panchromatic object estimate and the adjusted object estimates are iteratively DC biased until a "match" is made between the panchromatic object estimate and a measured panchromatic object image from the FFTS system, as will be described more fully below with reference to FIG. 10. Once a match is made, the image restoration is complete and the process ends.

Figure 9:
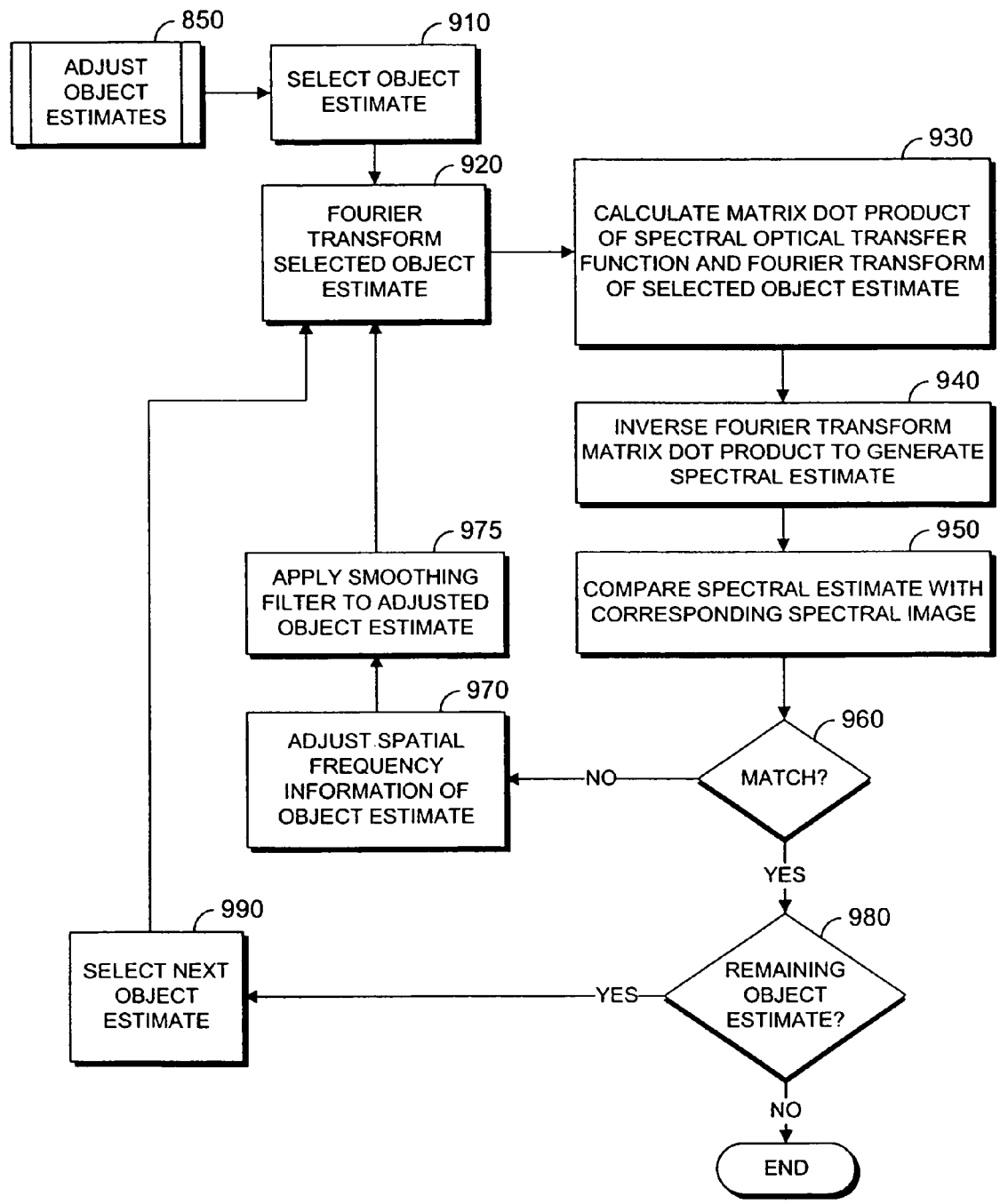
FIG. 9 is a flowchart depicting the method step of adjusting object estimates in greater detail according to one aspect of the present invention.

Turning to FIG. 9, step 850 of adjusting the object estimates is illustrated in greater detail. The process of adjusting the object estimates is iterative, and each object estimate is adjusted in turn. Accordingly, the process begins in step 910 by selecting one of the object estimates generated in step 840. The selected object estimate is Fourier transformed in step 920 into a transformed object estimate which contains both real and imaginary terms. In step 930, a matrix dot product of the SOTF of the FFTS system and the transformed object estimate is calculated. Like the Fourier transform of the object estimate, the SOTF of the FFTS system contains both real and imaginary terms. Accordingly, a matrix dot product of the SOTF and the transformed object estimate is possible, since both the transformed object estimate and the SOTF contain the same number of terms.

While the present exemplary embodiment has been described as including a FFTS system having two groups of collecting elements and one SOTF, the scope of the present invention is not limited to such an arrangement. Rather, the present invention has application to FFTS systems with any number of collecting element groups and any number of SOTFs, as will be apparent to one of skill in the art. In an embodiment in which a FFTS system has more than one SOTF, step 930 will include calculating the matrix dot product of each SOTF with the transformed object estimate.

In step 940, the matrix dot product calculated in step 930 is inverse Fourier transformed to generate a spectral object estimate. The inverse Fourier transform generates both a real and an imaginary component. The imaginary component is disregarded and the real component, when rendered in two dimensions, forms the spectral object estimate. The process steps 920 through 940 are together referred to as applying a system spectral optical transfer function to an object estimate.

In step 950, the spectral object estimate generated in step 940 is compared to the corresponding spectral image in the lambda cube. Both the spectral image and the spectral object estimate contain intensity information for every field point of the object. Differences between the intensity levels for each corresponding field point are calculated.

In step 960, the differences between the spectral image and the spectral object estimate are compared to a first predetermined margin of difference. If the differences between the spectral image and the spectral object estimate do not fall within the first predetermined margin of difference, a "match" has not been made, so the process proceeds to step 970. In step 970, the spatial frequency of the object estimate is adjusted by increasing or decreasing the intensity for each field point in the object estimate, based upon the differences between the spectral object estimate and the spectral image determined in the comparison of step 950. In step 975, a smoothing filter is applied to the adjusted object estimate, to reduce unwanted high-frequency ringing in the object estimate. The smoothing filter (e.g., a flatness metric) smoothes the object estimate while maintaining the real high frequency edges that are present in the object, as described in greater detail with reference to FIGS. 13 and 14. The steps of 920 through 950 are then repeated.

Once the differences between the spectral image and the spectral object estimate fall within the predetermined margin of difference, a "match" is made in step 960, and the process proceeds to step 980. In step 980, the process determines if there is a remaining object estimate to be processed. If so, the next object estimate is selected in step 990, and steps 920 through 975 are performed upon the new object estimate until a match is made in step 960. Once every object estimate has been processed, as determined in step 980, step 850 of adjusting the object estimates ends, and the process continues to step 860 of FIG. 8, which is illustrated in greater detail in FIG. 10.

The process of restoring the adjusted object estimates is iterative, but unlike the process of adjusting the object estimates, all the adjusted object estimates are restored and summed before being compared against a measured panchromatic object image. Accordingly, the process begins in step 1010 by selecting one of the adjusted object estimates from step 840. The selected adjusted object estimate is Fourier transformed in step 1020 into a transformed adjusted object estimate which contains both real and imaginary terms. In step 1030, a matrix dot product of the OTF of the FFTS system and the transformed adjusted object estimate is calculated. Like the transformed adjusted object estimate, the OTF contains both real and imaginary terms. Accordingly, a matrix dot product of the OTF and the transformed adjusted object estimate is possible, since both the transformed adjusted object estimate and the OTF contain the same number of terms.

In step 1040, the matrix dot product calculated in step 1030 is inverse Fourier transformed to generate a monochromatic object estimate. The inverse Fourier transform generates both a real and an imaginary component. The imaginary component is disregarded and the real component, when rendered in two dimensions, forms the monochromatic object estimate. The process steps 1020 through 1040 are together referred to as applying a system optical transfer function to an object estimate.

In step 1050, the process determines if there is a next adjusted object estimate to be restored. If so, the next adjusted object estimate is selected in step 1055, and steps 1020 through 1040 are performed upon the next adjusted object estimate. Once the optical transfer function has been applied to every adjusted object estimate, the process proceeds to step 1060.

Figure 11A:
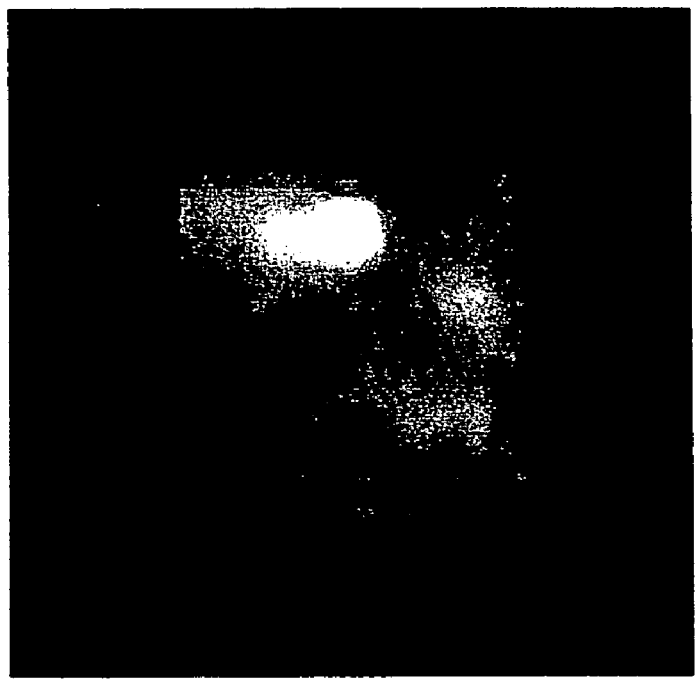
FIG. 11A depicts a panchromatic object estimate according to one aspect of the present invention.

In step 1060, all of the monochromatic object estimates generated in step 1040 are summed. Because each monochromatic object estimate corresponds to a specific range of wavelengths of the collected radiation, the sum of the monochromatic object estimates forms a panchromatic object estimate for the object. An exemplary panchromatic object estimate 1110 is illustrated in FIG. 11A.

Returning to FIG. 10, the panchromatic object estimate generated in 1060 is compared in step 1070 to a panchromatic image of the object measured by the FFTS system. Both the measured panchromatic object image and the panchromatic object estimate contain intensity information for every field point of the object. Differences between the intensity levels for each corresponding field point are calculated. The differences in intensity between corresponding field points in the one or more regions containing predetermined spectral information are important to the process, as these regions in the adjusted object estimates can be used to determine by how much each adjusted object estimate should be restored, as discussed more fully below.

According to one embodiment, the measured panchromatic object image is one of the interference patterns in the delta cube corresponding to zero phase delay (e.g., a zero optical path length difference) between the portions of the collected wavefront. In another embodiment, the measured panchromatic object image is not included in the delta cube, and is generated by the FFTS system in a separate step.

In step 1080, the differences between the measured panchromatic object image and the panchromatic object estimate are compared to a second predetermined margin of difference. If the differences between the measured panchromatic object image and the panchromatic object estimate do not fall within the second predetermined margin of difference, a "match" has not been made, so the process proceeds to step 1090. In step 1090, a DC bias is applied to one or more of the adjusted object estimates, based upon the differences in intensity between the measured panchromatic object image and the panchromatic object estimate in corresponding field points in the one or more regions containing predetermined spectral information.

For example, in the present exemplary embodiment in which border region 202 of object 200 is known to have zero intensity in every spectral frequency (because of the artificial imposition of shadows by field stops 111 and 112 at intermediate image points in FFTS system 100), a DC bias (which increases or reduces the intensity at each field point by a uniform amount) is applied to each adjusted object estimate until the intensity in the region corresponding to border region 202 is zero. Accordingly, the use of imposed border region 202 provides a known target for intensity information at all spectral frequencies to assist in the restoring step.

In other embodiments in which regions of the object contain known spectral signatures, such as, for example, objects with large expanses of concrete, the process of applying a DC bias in step 1090 is similar. Using the known spectral signature of concrete, a DC bias is applied to each adjusted object estimate until the intensity of the identified concrete region in the spectral region represented by each adjusted object estimate matches the known spectral signature of concrete. Another example of a region with a known spectral signature is a low-heat region in the infrared spectral region of the object.

Figure 11B:
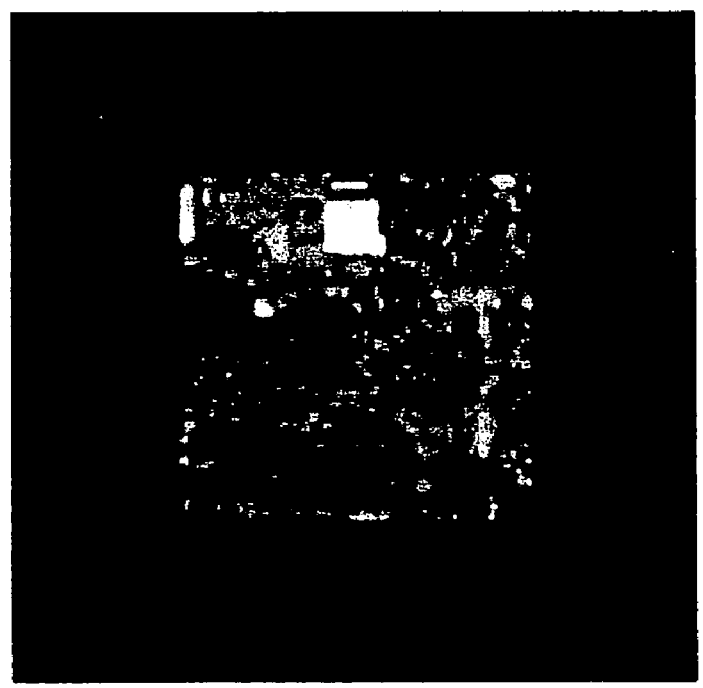
FIG. 11B depicts a restored image according to one aspect of the present invention.

The process steps 1010 through 1090 repeat until the differences between the measured panchromatic object image and the panchromatic object estimate fall within the predetermined margin of difference. At this point, a "match" is made in step 1080, and the process ends. The panchromatic object estimate thus generated constitutes a restored image of the object, in which the low and zero spatial frequency spectral information has been restored. An exemplary restored image 1120 is illustrated in FIG. 11B.

Turning to FIGS. 12A to 12C, step 975 of applying a smoothing filter to an adjusted object estimate is illustrated in greater detail. An exemplary adjusted object estimate 1210 shown in FIG. 12A contains high frequency "ringing" (e.g., the amplitude changes drastically in regions of high spatial frequency). This is illustrated in the graph 1230 of FIG. 12C of pixel intensity along a pixel line 1215 in adjusted object estimate 1210. Prior to smoothing, sharp peaks and valleys are present in graph 1230. After applying a smoothness filter, however, ringing in the smoothed object estimate 1220 is reduced. This is illustrated in graph 1230 of FIG. 12B which shows the pixel intensity along a line 1225 of smoothed adjusted object estimate 1220.

Figure 13A:
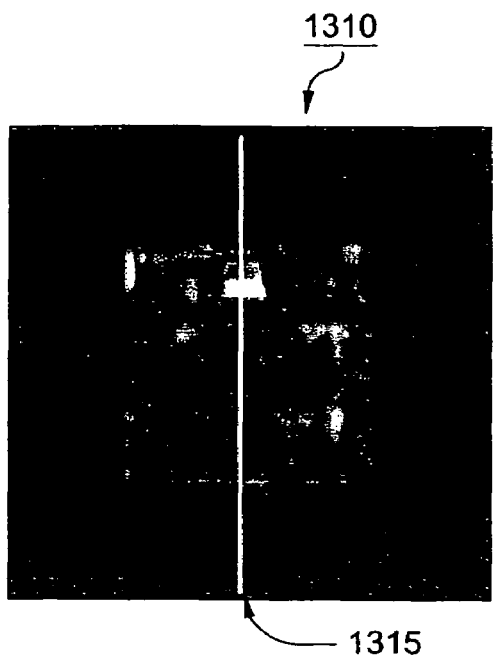
FIGS. 13A to 13C illustrate the method step of applying a smoothing filter to an object estimate according to one aspect of the present invention.
Figure 13B:
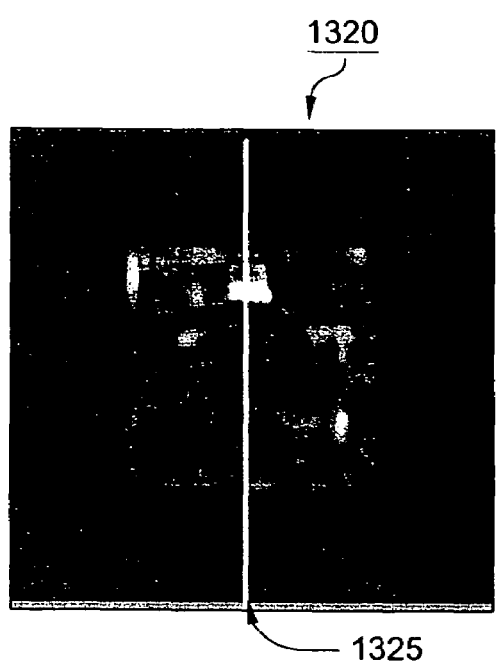
Figure 13C:
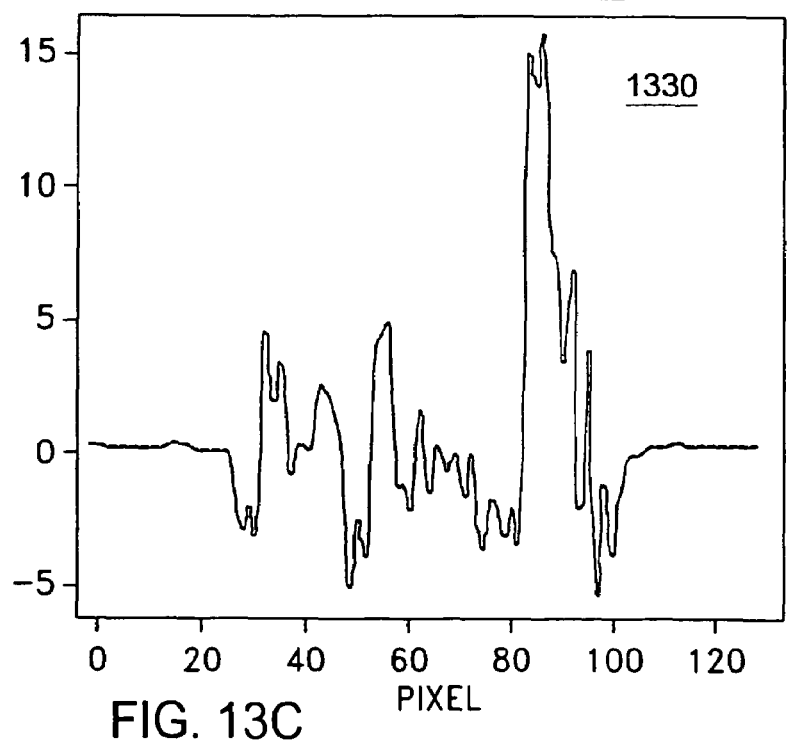

Applying a smoothing filter in step 975 does not negatively impact the spectral object estimate generated in steps 920 through 940. This is illustrated in FIGS. 13A to 13C, in which a spectral object estimate 1310 shown in FIG. 13A for adjusted object estimate 1210 is compared to a spectral object estimate 1320 shown in FIG. 13B for smoothed adjusted object estimate 1220. The graph 1330 shown in FIG. 13C of pixel intensities along the pixel lines 1315 and 1325 shows a very close match of the spectral object estimates for both the non-smoothed adjusted object estimate 1310 and the smoothed adjusted object estimate 1320.

Figure 14A:
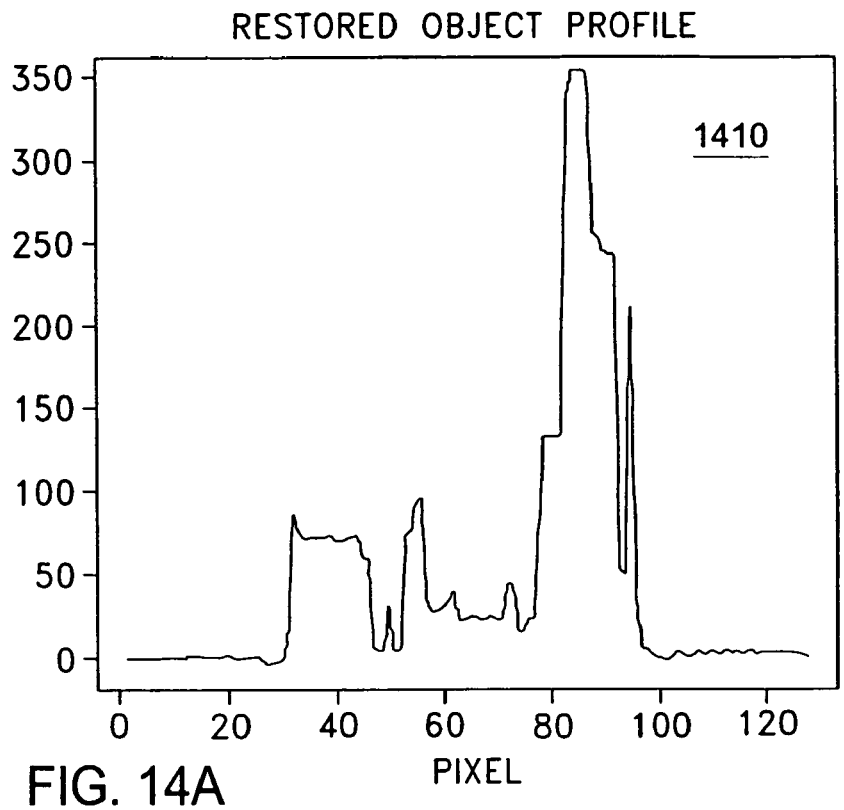
FIG. 14A is a graph illustrating the restoration of low spatial frequency spectral information to an image restored according to one aspect of the present invention.
Figure 14B:
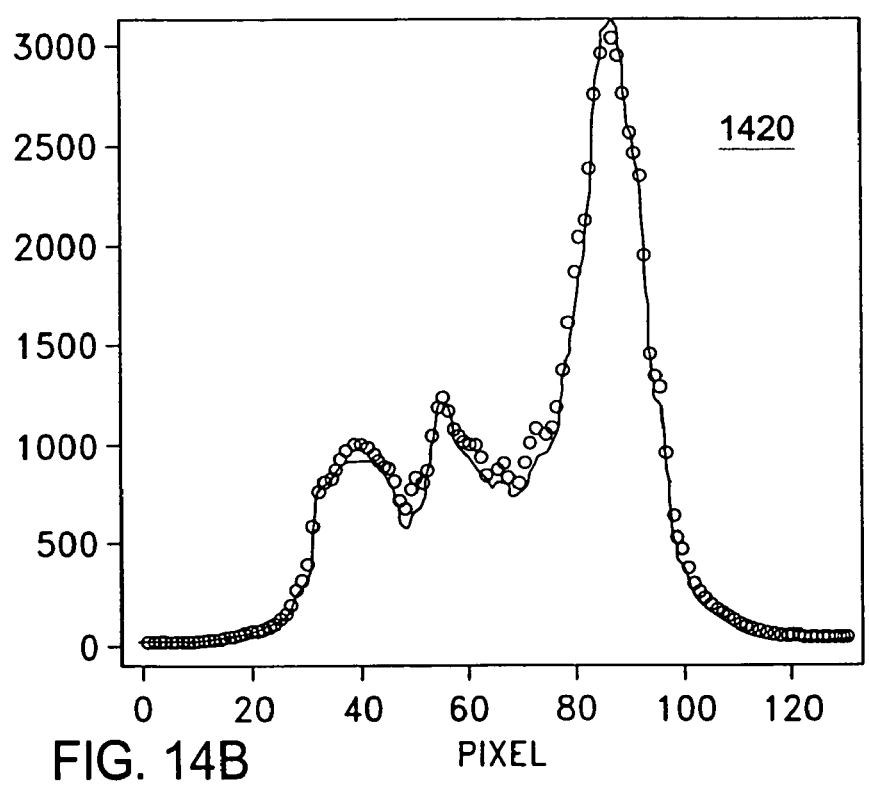
FIG. 14B is a graph illustrating the agreement between a restored image and a measured panchromatic object image according to one aspect of the present invention.

Turning to FIG. 14A, a graph 1410 of pixel intensities along a line (not shown) through restored image 1120 is illustrated. The regions of restored image 1120 corresponding to the regions of predetermined spectral information (in this embodiment, the borders corresponding to pixels 0 to 23 and pixels 104 to 127) have zero intensity, as low frequency curvature in these regions has been removed. FIG. 14B provides graph 1420 which illustrates the close match between restored image 1120 and the measured panchromatic object image.

Figure 15A:
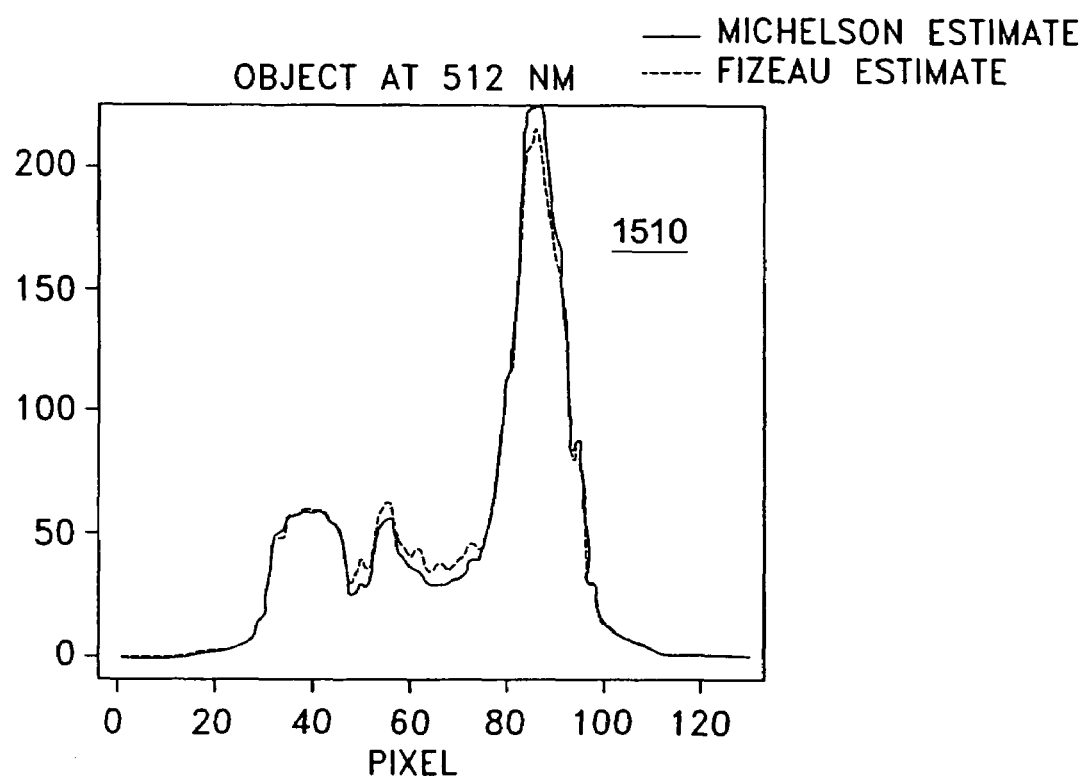
FIGS. 15A to 15C are graphs illustrating the agreement between an image generated by a Michelson Fourier transform spectrometer and an image restored according to one aspect of the present invention.
Figure 15B:
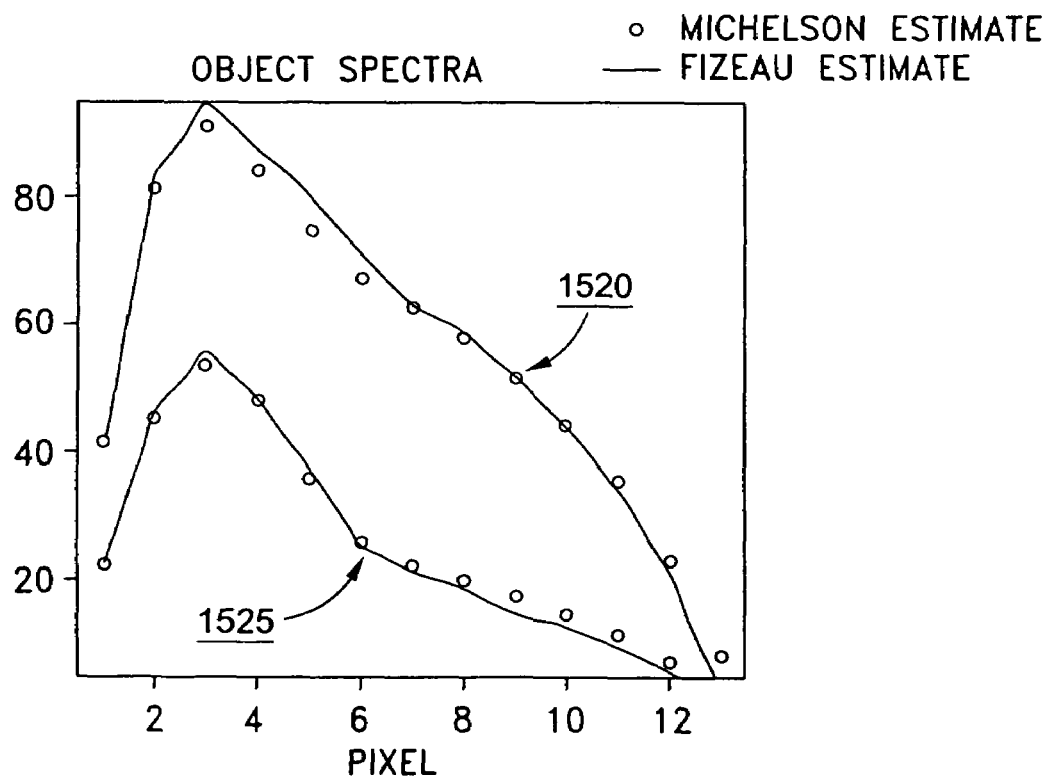
Figure 15C:
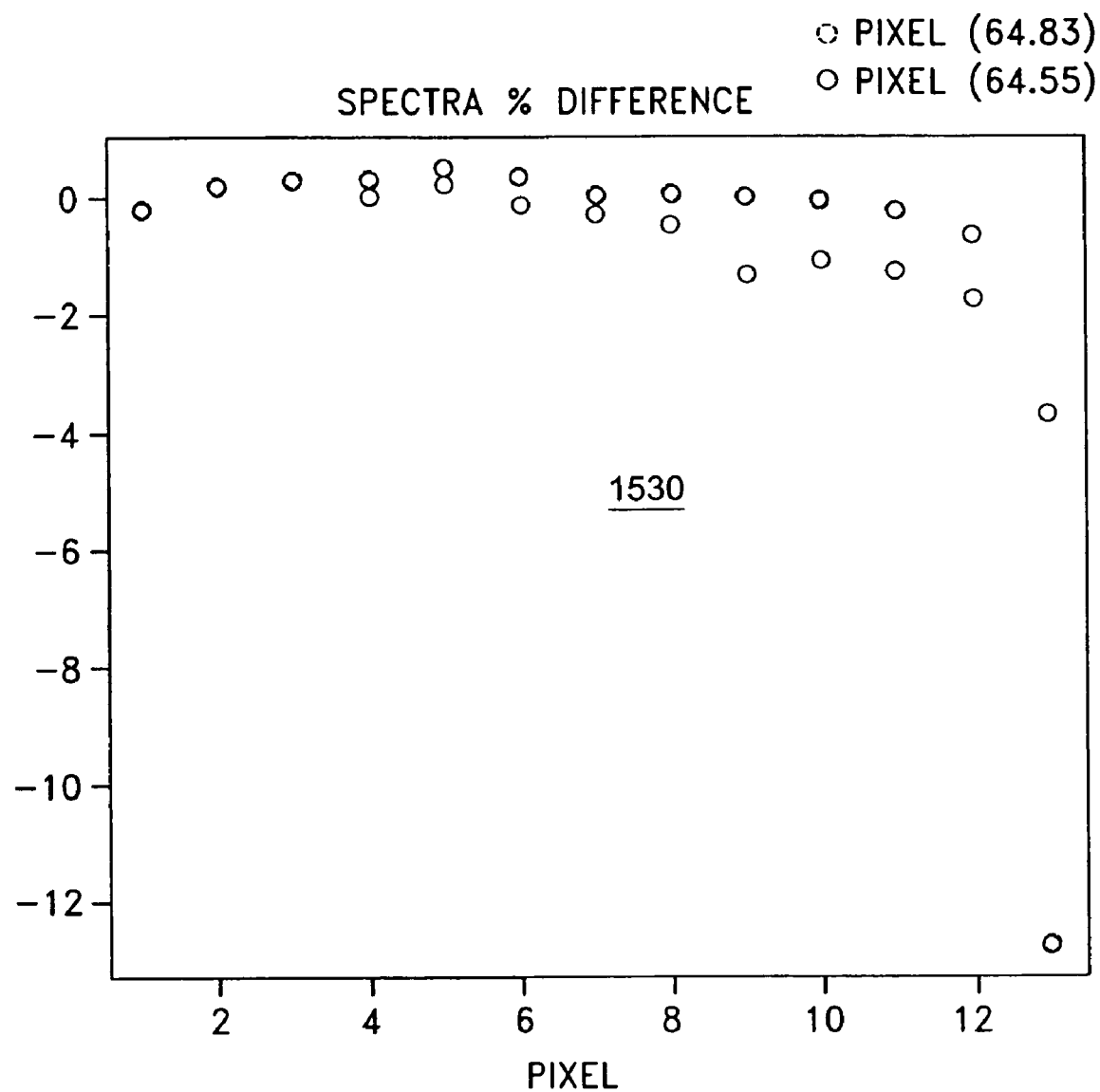

FIGS. 15A, 15B and 15C illustrate the close agreement between an image restored according to the method of the present invention and an image generated using Fourier transform spectrometry in a Michelson interferometer. In this regard, graph 1510 of FIG. 15A shows the agreement between restored object 1120 and a spectral image of the same object 200 generated by a Michelson Fourier transform spectrometer. FIG. 15B illustrates the agreement between restored object 1120 and a spectral image of the same object 200 generated by a Michelson Fourier transform spectrometer for the spectra of two different field points in curves 1520 and 1525. Graph 1530 of FIG. 15C illustrates the percentage difference in spectra for two different field points between restored object 1120 and a spectral image of the same object 200 generated by a Michelson Fourier transform spectrometer.

Figure 16:
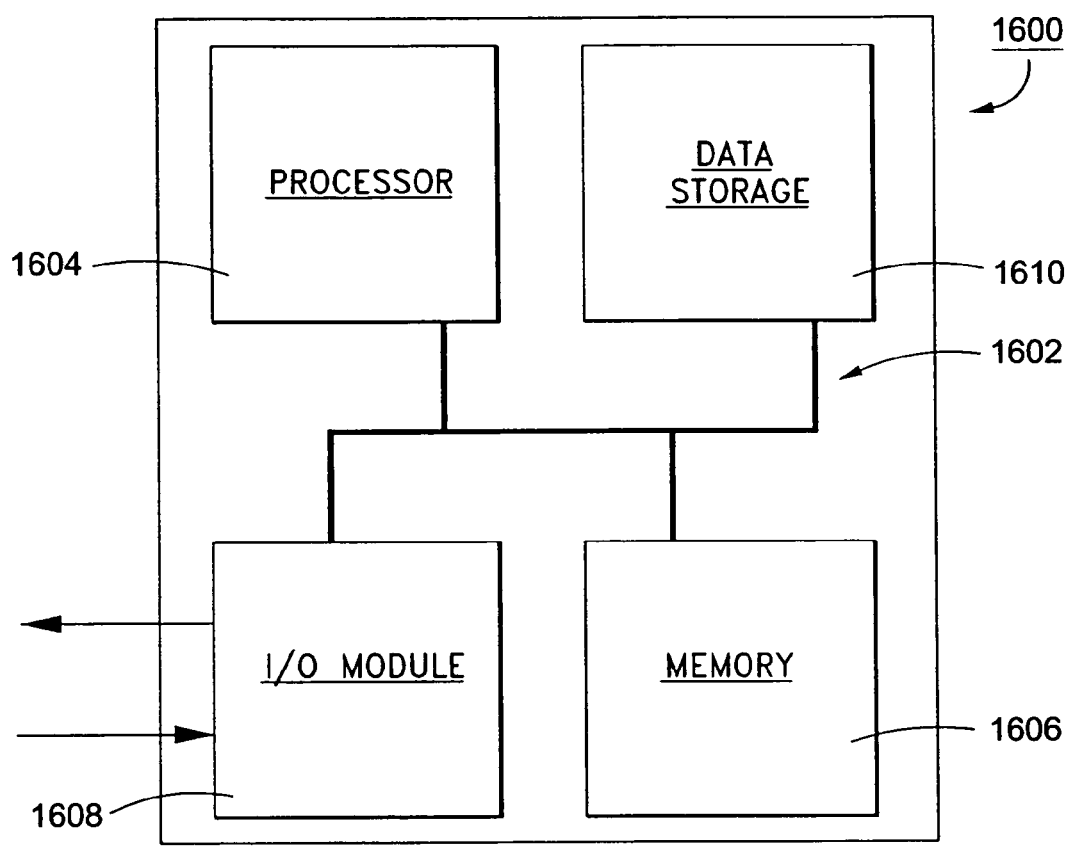
FIG. 16 is a block diagram illustrating a computer system upon which an embodiment of the present invention may be implemented.

FIG. 16 is a block diagram that illustrates a computer system 1600 upon which an embodiment of the present invention may be implemented. Computer system 1600 includes a bus 1602 or other communication mechanism for communicating information, and a processor 1604 coupled with bus 1602 for processing information. Computer system 1600 also includes a memory 1606, such as a random access memory ("RAM") or other dynamic storage device, coupled to bus 1602 for storing information and instructions to be executed by processor 1604. Memory 1606 may also be used for storing temporary variable or other intermediate information during execution of instructions to be executed by processor 1604. Computer system 1600 further includes a data storage device 1610, such as a magnetic disk or optical disk, coupled to bus 1602 for storing information and instructions.

Computer system 1600 may be coupled via I/O module 1608 to a display device (not illustrated), such as a cathode ray tube ("CRT") or liquid crystal display ("LCD") for displaying information to a computer user. An input device, such as, for example, a keyboard or a mouse may also be coupled to computer system 1600 via I/O module 1608 for communicating information and command selections to processor 1604.

According to one embodiment of the invention, restoring low spatial frequency information to an image using a Fizeau Fourier transform spectrometer system is provided by a computer system 1600 in response to processor 1604 executing one or more sequences of one or more instructions contained in memory 1606. Such instructions may be read into memory 106 from another computer-readable medium, such as data storage device 1610. Execution of the sequences of instructions contained in main memory 1606 causes processor 1604 to perform the process steps described herein. One or more processors in a multi-processing arrangement may also be employed to execute the sequences of instructions contained in memory 1606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1604 for execution. Such a medium may take many forms, including, but not limited to, non-volatile media, volatile media, and transmission media. Non-volatile media include, for example, optical or magnetic disks, such as data storage device 1610. Volatile media include dynamic memory, such as memory 1606. Transmission media include coaxial cables, copper wire, and fiber optics, including the wires that comprise bus 1602. Transmission media can also take the form of acoustic or light waves, such as those generated during radio frequency and infrared data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A method of restoring low spatial frequency spectral information to an image using a Fizeau Fourier transform spectrometer system having a plurality of collecting elements, the method comprising the steps of:

Fourier transforming interference patterns in a delta cube generated by interfering portions of a wavefront collected by the plurality of collecting elements to generate a lambda cube having a plurality of spectral images, each interference pattern in the delta cube corresponding to an interference pattern generated with a different optical path length of one or more of the collecting elements, each spectral image corresponding to a range of wavelengths of the collected wavefront;

identifying a region of the image for which a spectral information is predetermined;

generating a plurality of object estimates for each of which a spatial frequency information is uniform, each object estimate corresponding to a spectral image of the lambda cube;

adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube; and restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

2. The method of claim 1, wherein, within the adjusting step, the application of the system spectral optical transfer function includes Fourier transforming each object estimate, calculating a matrix dot product of the Fourier transform of each object estimate and a cross correlation of different pupil functions of the plurality of collecting elements and inverse Fourier transforming the matrix dot product to generate a spectral object estimate.

3. The method of claim 1, wherein, within the restoring step, the application of the system optical transfer function includes Fourier transforming each adjusted object estimate, calculating a matrix dot product of the Fourier transform of each adjusted object estimate and an auto-correlation of a pupil function of the plurality of collecting elements and inverse Fourier transforming the matrix dot product to generate a monochromatic object estimate.

4. The method of claim 1, wherein, within the adjusting step, the modification of the spatial frequency information includes applying a smoothness filter to each object estimate to remove ringing.

5. The method of claim 1, wherein the measured panchromatic object image is one of the plurality of interference patterns in the delta cube corresponding to a zero optical path length difference between the collecting elements.

6. The method of claim 1, wherein the identified region of the image with the predetermined spectral information is generated by imposing a shadow at a plurality of intermediate image points in the Fizeau Fourier transform spectrometer system.

7. The method of claim 1, wherein the identified region of the image with the predetermined spectral information includes a border region of shadow in the image.

8. The method of claim 1, wherein the identified region of the image with the predetermined spectral information is a region of low spatial frequency.

9. The method of claim 1, wherein the identified region of the image with the predetermined spectral information is a region of low heat identified in a spectral range of the collected wavefront.

10. A computer readable medium carrying instructions executable by a processor to perform process steps for restoring low spatial frequency spectral information to an image using a Fizeau Fourier transform spectrometer system having a plurality of collecting elements, the process steps including:

Fourier transforming interference patterns in a delta cube generated by interfering portions of a wavefront collected by the plurality of collecting elements to generate a lambda cube having a plurality of spectral images, each interference pattern in the delta cube corresponding to an interference pattern generated with a different optical path length of one or more of the collecting elements, each spectral image corresponding to a range of wavelengths of the collected wavefront;

identifying a region of the image for which a spectral information is predetermined;

generating a plurality of object estimates for each of which a spatial frequency information is uniform, each object estimate corresponding to a spectral image of the lambda cube;

adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube; and restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

11. The computer readable medium of claim 10, wherein, within the adjusting step, the application of the system spectral optical transfer function includes Fourier transforming each object estimate, calculating a matrix dot product of the Fourier transform of each object estimate and a cross correlation of different pupil functions of the plurality of collecting elements and inverse Fourier transforming the matrix dot product to generate a spectral object estimate.

12. The computer readable medium of claim 10, wherein, within the restoring step, the application of the system optical transfer function includes Fourier transforming each adjusted object estimate, calculating a matrix dot product of the Fourier transform of each adjusted object estimate and an auto-correlation of a pupil function of the plurality of collecting elements and inverse Fourier transforming the matrix dot product to generate a monochromatic object estimate.

13. The computer readable medium of claim 10, wherein, within the adjusting step, the modification of the spatial frequency information includes applying a smoothness filter to each object estimate to remove ringing.

14. The computer readable medium of claim 10, wherein the measured panchromatic object image is one of the plurality of interference patterns in the delta cube corresponding to a zero optical path length difference between the collecting elements.

15. The computer readable medium of claim 10, wherein the identified region of the image with the predetermined spectral information is generated by imposing a shadow at a plurality of intermediate image points in the Fizeau Fourier transform spectrometer system.

16. The computer readable medium of claim 10, wherein the identified region of the image with the predetermined spectral information includes a border region of shadow in the image.

17. The computer readable medium of claim 10, wherein the identified region of the image with the predetermined spectral information is a region of low spatial frequency.

18. The computer readable medium of claim 10, wherein the identified region of the image with the predetermined spectral information is a region of low heat identified in a spectral range of the collected wavefront.

19. A Fizeau Fourier transform spectrometer system, comprising: a plurality of collecting elements disposed to collect portions of a wavefront, each of the plurality of collecting elements having a field stop at an intermediate image point, and at least one of the plurality of collecting elements having an adjustable optical path length;

combiner optics for combining and interfering the collected portions of the wavefront on an image plane to generate a delta cube having a plurality of interference patterns, each interference pattern in the delta cube corresponding to an interference pattern generated with a different optical path length of one or more of the collecting elements;

one or more processors; and a computer readable medium carrying one or more sequences of instructions for restoring low spatial frequency spectral information to an image, wherein execution of the one or more sequences of instructions by the one or more processors causes the one or more processors to perform the steps of:

Fourier transforming the interference patterns in the delta cube to generate a lambda cube having a plurality of spectral images, each spectral image corresponding to a range of wavelengths of the collected wavefront;

identifying a region of the image for which a spectral information is predetermined;

generating a plurality of object estimates for each of which a spatial frequency information is uniform, each object estimate corresponding to a spectral image of the lambda cube;

adjusting each of the object estimates by applying a system spectral optical transfer function to each object estimate to generate a spectral object estimate and then modifying the spatial frequency information of each object estimate until each spectral object estimate is within a first predetermined margin with respect to the corresponding spectral image of the lambda cube; and restoring each of the adjusted object estimates by applying a system optical transfer function to each adjusted object estimate to generate a monochromatic object estimate, summing the monochromatic object estimates for all adjusted object estimates to generate a panchromatic object estimate and then applying a DC bias to each adjusted object estimate until the spectral information of the identified region of the panchromatic object estimate is within a second predetermined margin with respect to the spectral information of the identified region of a measured panchromatic object image.

20. The system of claim 19, wherein, within the adjusting step, the application of the system spectral optical transfer function includes Fourier transforming each object estimate, calculating a matrix dot product of the Fourier transform of each object estimate and a cross correlation of different pupil functions of the plurality of collecting elements and inverse Fourier transforming the matrix dot product to generate a spectral object estimate.

21. The system of claim 19, wherein, within the restoring step, the application of the system optical transfer function includes Fourier transforming each adjusted object estimate, calculating a matrix dot product of the Fourier transform of each adjusted object estimate and an auto-correlation of a pupil function of the plurality of collecting elements and inverse Fourier transforming the matrix dot product to generate a monochromatic object estimate.

22. The system of claim 19, wherein, within the adjusting step, the modification of the spatial frequency information includes applying a smoothness filter to each object estimate to remove ringing.

23. The system of claim 19, wherein the measured panchromatic object image is one of the plurality of interference patterns in the delta cube corresponding to a zero optical path length difference between the collecting elements.

24. The system of claim 19, wherein the identified region of the image with predetermined spectral information includes a border region of shadow in the image imposed on the image by the plurality of field stops.

25. The system of claim 19, wherein the identified region of the image with the predetermined spectral information includes a border region of shadow in the image.

26. The system of claim 19, wherein the identified region of the image with the predetermined spectral information is a region of low spatial frequency.

27. The system of claim 19, wherein the identified region of the image with the predetermined spectral information is a region of low heat identified in a spectral range of the collected wavefront.

\* \* \* \* \*